(12) United States Patent
Ohno et al.

(10) Patent No.: US 6,291,046 B1
(45) Date of Patent: Sep. 18, 2001

(54) OPTICAL INFORMATION RECORDING MEDIUM AND METHOD FOR PRODUCING THE SAME

(75) Inventors: Eiji Ohno, Hirakata; Hidemi Isomura, Moriguchi; Akihiro Moteki, Yawata, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/436,293

(22) Filed: Nov. 8, 1999

Related U.S. Application Data (62) Division of application No. 09/120,081, filed on Jul. 21, 1998, now Pat. No. 6,165,578.

(30) Foreign Application Priority Data

Jul. 23, 1997 (JP) .................................... 9-196714

(51) Int. Cl.$^7$ ...................................... B32B 3/02
(52) U.S. Cl. ................ 428/64.1; 428/64.2; 428/64.4; 428/698; 428/913; 430/270.11; 430/495.1; 430/945; 156/160; 156/196
(58) Field of Search ................ 428/64.1, 64.2, 428/64.4, 457, 698, 702, 913; 430/270.11, 495.1, 945; 369/283; 156/160, 163, 196, 228

(56) References Cited

U.S. PATENT DOCUMENTS 5,862,121  1/1999  Suzuki .

FOREIGN PATENT DOCUMENTS

| 6168744 | 4/1986 | (JP) . |
| 6180863 | 6/1994 | (JP) . |
| 11096598 | * 4/1999 | (JP) . |
| 330288 | 4/1997 | (TW) . |

* cited by examiner

Primary Examiner—Elizabeth Evans
(74) Attorney, Agent, or Firm—Renner, Otto, Boisselle & Sklar, LLP (57) ABSTRACT

An optical information recording medium includes a first substrate; at least a first dielectric layer and a recording layer for signal recording provided on a surface of the first substrate; and a second substrate. The first substrate and the second substrate are assembled together in the state of being warped in planar symmetry and flattened. The first dielectric layer and the recording layer is interposed between the first substrate and the second substrate.

23 Claims, 10 Drawing Sheets

OPTICAL INFORMATION RECORDING MEDIUM AND METHOD FOR PRODUCING THE SAME

This is a division of application Ser. No. 09/120,081, filed Jul. 21, 1998 now U.S. Pat. No. 6,165,578 issued Dec. 26, 2000.

BACKGROUND OF THE INVENTION

1. Field of the Invention

The present invention relates to a rewritable optical information recording medium including two sub-strates assembled together and a method for producing the same.

2. Description of the Related Art

Technologies for performing high-density recording of information and reproduction of such information using laser beams are known. For example, optical disks have been put into practical use. Optical disks are roughly classified into read-only type, write-once type, and rewritable type. The read-only type is realized as products such as, for example, compact disks having musical information stored therein and laser disks having image information stored therein. The write-once type is realized as products such as, for example, document files and still picture files. Currently, research and development is mainly performed on rewritable type. The rewritable type is being realized as products such as, for example, data files for personal computers.

A general optical disk has a transparent resin substrate having a thickness of 1.2 mm, a recording layer provided on one surface of the substrate, and a protective layer such as, for example, an overcoat provided on the recording layer. Another general optical disk includes a substrate and a protective plate formed of the same material as the substrate which are assembled together with an adhesive.

In order to increase the recording density of optical disks, studies have been recently performed for shortening the wavelength of the laser light and using an objective lens having a large numerical aperture (NA). However, as the wavelength of the laser light is shortened and the numerical aperture is increased, the tolerance for the angle of the disk with respect to the incident angle of the laser light (referred to as the "tilt") is reduced. Reducing the substrate thickness (distance from the surface of the substrate to the recording layer) is effective in increasing the tolerance for the tilt. For example, the substrate thickness of a digital video disk (DVD) is 0.6 mm. Since the resin substrate having a thickness of 0.6 mm is insufficient in mechanical strength, two such substrates are assembled with the recording layer interposed therebetween.

The substrates are assembled by various methods, such as, for example, applying a hot melt resin on a surface of one substrate and then putting the substrates into contact with each other, assembling the two substrates with an adhesive tape (two-sided tape) interposed therebetween, or applying a ultraviolet (UV) curable resin on a surface of one substrate, then putting the two substrates into contact with each other and curing the resin with ultraviolet rays.

It has been found that a substrate having a thickness of as small as 0.6 mm is significantly warped when provided with a thin layer including a rewritable recording layer on a surface of the substrate.

Such a phenomenon does not occur when a substrate having a thickness of 0.6 mm is provided with a thin layer including a read-only recording layer, i.e., a metal reflective layer (formed of, for example, Al or Au) on a surface of the substrate. The phenomenon does not occur with a substrate having a thickness of 1.2 mm regardless of a thin film, including a rewritable recording layer or a read-only recording layer is provided.

The cause of the warp is considered to be as follows. In the case of the rewritable type disks, a dielectric layer is included in the thin layer in addition to the recording layer for protecting the recording layer. Formation of the dielectric layer generates a large stress, and the stress warps the substrate which has an insufficient mechanical strength.

When such a significantly warped substrate and another substrate which is not warped are assembled together to product an optical disk capable of one-side recording and reproduction, the resultant optical disk is also warped. Such a warped optical disk is not usable.

When two substrates which have the same thin layers and thus are warped at the same degree are assembled, a highly flat optical disk is obtained because the stresses generated in both substrates are balanced. However, use of two substrates both having the recording layers for producing an optical disk for one-side recording disadvantageously raises the production costs.

SUMMARY OF THE INVENTION

According to one aspect of the invention, an optical information recording medium includes a first substrate; at least a first dielectric layer and a recording layer for signal recording provided on a surface of the first substrate; and a second substrate. The first substrate and the second substrate are assembled together in the state of being warped in planar symmetry with respect to each other and flattened, the first dielectric layer and the recording layer being interposed between the first substrate and the second substrate.

In one embodiment of the invention, an optical information recording medium further includes a thin layer provided on a surface of the second substrate, the surface being opposed to the first substrate.

In one embodiment of the invention, the thin layer includes a second dielectric layer.

In one embodiment of the invention, the thin layer includes a second dielectric layer formed of an identical material as that of the first dielectric layer provided on the first substrate.

In one embodiment of the invention, the thin layer includes a metal layer.

In one embodiment of the invention, the thin layer has such a thickness to warp the second substrate to substantially an equal degree with the first substrate.

In one embodiment of the invention, an optical information recording medium further includes a resin layer formed of a resin provided on a surface of the second substrate which shrinks when being cured, the resin layer being provided on the surface not facing the first substrate.

In one embodiment of the invention, the resin layer is formed of a UV curable resin.

In one embodiment of the invention, the resin layer is transparent with respect to UV light.

In one embodiment of the invention, the resin layer is non-transparent with respect to visible light.

In one embodiment of the invention, the resin layer has graphics thereon.

In one embodiment of the invention, the second substrate is warped while being formed.

In one embodiment of the invention, the second substrate is formed by an injection method.

In one embodiment of the invention, at least one of the first substrate and the second substrate has a thickness of about 0.8 mm or less.

According to one aspect of the invention, an optical information recording medium includes a first substrate; at least a first dielectric layer and a recording layer for signal recording provided on a surface of the first substrate; a second substrate; and a thin layer on which a signal is unrecordable, the thin layer being provided on a surface of the second substrate. The first substrate and the second substrate are assembled together with the first dielectric layer, the recording layer and the thin layer being interposed therebetween.

In one embodiment of the invention, the thin layer includes a second dielectric layer.

In one embodiment of the invention, the thin layer includes a second dielectric layer formed of an identical material as that of the first dielectric layer provided on the first substrate.

In one embodiment of the invention, the first dielectric layer and the second dielectric have a substantially equal thickness.

According to one aspect of the invention, an optical information recording medium includes a first substrate; a plurality of first dielectric layers, a recording layer for signal recording provided between the plurality of dielectric layers, and a metal layer, which are provided on a surface of the first substrate; a second substrate; and a thin layer, including at least one second dielectric layer and a metal layer, on which a signal is unrecordable, the thin layer being provided on a surface of the second substrate. The first substrate and the second substrate are assembled together with the plurality of first dielectric layers, the at least one second dielectric layer, the recording layer, the metal layer, and the thin metal layer being interposed therebetween.

In one embodiment of the invention, the plurality of first dielectric layers and the at least one second dielectric layer has a substantially equal total thickness.

According to one aspect of the invention, an optical information recording medium includes a first substrate; at least a dielectric layer and a recording layer for signal recording provided on a surface of the first substrate; a second substrate; and a resin layer formed of a resin which shrinks when being cured, the resin layer being provided on a surface of the second substrate. The first substrate and the second substrate are assembled together with the dielectric layer and the recording layer being interposed therebetween, and the resin layer is not interposed therebetween.

In one embodiment of the invention, the resin layer is formed of a UV curable resin.

According to one aspect of the invention, an optical information recording medium includes a first substrate; at least a dielectric layer, a recording layer for signal recording provided on a surface of the first substrate, and a first resin layer formed of a resin which shrinks when being cured; and a second substrate. The first substrate and the second substrate are assembled together with the dielectric layer, the recording layer and the first resin layer being interposed therebetween.

In one embodiment of the invention, an optical information recording medium further includes a second resin layer having a smaller tensile strength than that of the first resin layer, the second resin layer being provided on a surface of the second substrate, the second resin layer being provided on the surface facing the first substrate.

In one embodiment of the invention, the second resin layer has a smaller thickness than that of the first resin layer.

In one embodiment of the invention, the second resin layer is transparent with respect to UV light.

In one embodiment of the invention, the second resin layer is non-transparent with respect to visible light.

In one embodiment of the invention, the second resin layer has graphics thereon.

In one embodiment of the invention, at least one of the first substrate and the second substrate has a thickness of about 0.8 mm or less.

According to one aspect of the invention, a method for producing an optical information recording medium includes the steps of forming at least a first dielectric layer and a recording layer for signal recording on a surface of a first substrate; warping a second substrate; and assembling the first substrate, which is warped, and the second substrate in planar symmetry with respect to each other, and flattening an assembly of the first substrate and the second substrate.

In one embodiment of the invention, the step of warping the second substrate includes the step of forming a thin layer on a surface of the second substrate, the surface being opposed to the first substrate.

In one embodiment of the invention, the step of forming the thin layer includes the step of forming a second dielectric layer.

In one embodiment of the invention, the step of forming the thin layer includes the step of forming a second dielectric layer formed of an identical material with that of the first dielectric layer.

In one embodiment of the invention, the step of forming the thin layer includes the step of forming a metal layer.

In one embodiment of the invention, the step of warping the second substrate includes the step of forming a resin layer of a resin which shrinks when being cured on a surface of the second substrate, the resin layer being formed on the surface not facing the first substrate.

In one embodiment of the invention, the step of forming the resin layer includes the step of forming a UV curable resin layer.

In one embodiment of the invention, the step of warping the second substrate includes the step of causing a warp to the second substrate while the second substrate is being formed by an injection method.

In one embodiment of the invention, the second substrate is formed by an injection method.

According to one aspect of the invention, a method for producing an optical information recording medium includes the steps of forming at least a dielectric layer and a recording layer for signal recording on a surface of a first substrate; forming a resin layer of a resin which shrinks when being cured on the recording layer; and assembling the first substrate and a second substrate opposed to the first substrate with the dielectric layer and the recording layer being interposed therebetween.

Thus, the invention described herein makes possible the advantages of providing a flat and low-cost optical information recording medium, for one-side recording and reproduction, including two thin substrates assembled together, and a method for producing the same.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative examples with reference to the accompanying drawings.

First, the principle of the present invention will be described.

A general rewritable recording medium includes a transparent substrate formed of, for example, a polycarbonate, a plurality of dielectric layers provided on the substrate, a recording layer interposed between the plurality of dielectric layers, and optionally a reflective layer. The dielectric layers are provided for protecting the recording layer against contamination by water and oxygen and also for protecting the substrate against the high temperature of the recording layer caused at the time of signal recording. Most rewritable recording mediums include a dielectric layer as an indispensable element.

Exemplary materials usable for the dielectric layer include oxides of metals or semi-metal materials, nitrides, chalcogenides, fluorides, carbides, and mixtures thereof. More specifically, exemplary materials usable for the dielectric layer include $SiO_2$, $SiO$, $Al_2O_3$, $GeO_2$, $In_2O_3$, $Ta_2O_5$, $TeO_2$, $TiO_2$, $MoO_3$, $WO_3$, $ZrO_2$, $Si_3N_4$, $Ge_3N_4$, $AlN$, $BN$, $TiN$, $ZnS$, $CdS$, $CdSe$, $ZnSe$, $ZnTe$, $AgF$, $PbF_2$, $MnF_2$, $NiF_2$, $SiC$, or mixtures thereof, a diamond thin layer and diamond-like carbon.

Exemplary materials usable for the recording layer for an optical disk for phase-change recording include alloys such as GeSbTe, InSbTe, InSbTeAg, GaSb, InGaSb, GeSnTe, AgSbTe. Recording mediums for recording information by other mechanisms are also usable.

The dielectric layer and the recording layer are formed by, for example, sputtering or vacuum vapor deposition. When a thin layer including a dielectric layer is formed on a thin substrate having a thickness of, for example, 0.6 mm, by sputtering or vacuum vapor deposition, the substrate is significantly warped. As described above, when such a significantly warped substrate and another substrate which includes no thin layer and thus is not warped are assembled to produce an optical disk for one-side recording and reproduction, the optical disk is also warped. Such a warped optical disk is not usable.

EXAMPLE 1

FIGS. 1A through 1F are cross-sectional views illustrating a method for producing an optical information recording medium (referred to simply as an optical disk) 100 according to a first example of the present invention. FIG. 2A is a cross-sectional view of a first substrate 1 and layers provided thereon. FIG. 2B is a cross-sectional view of a second substrate 2 and layers provided thereon.

The optical disk 100 in the first example includes the first substrate 1 and the second substrate 2, each having a thickness of 0.6 mm, which are assembled together. The first substrate 1 is provided with a laminated information rewriting layer 3 (FIG. 1C) including at least a dielectric layer and a recording layer. By providing the laminated information rewriting layer 3, the first substrate 1 warps. Accordingly, the second substrate 2 is also provided with a dielectric layer 4 so as to be warped, and the first substrate 1 and the second substrate 2 are assembled with the laminated information rewriting layer 3 and the dielectric layer 4 being inside. Thus, the optical disk 100 which is flat is obtained.

Figure 1A:
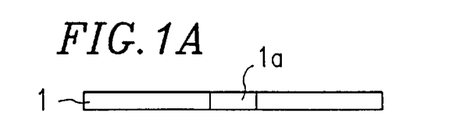
FIGS. 1A through 1F are cross-sectional views illustrating a method for producing an optical disk according to a first example of the present invention.
Figure 1B:
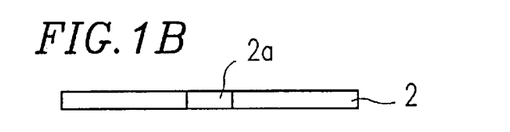
Figure 2A:
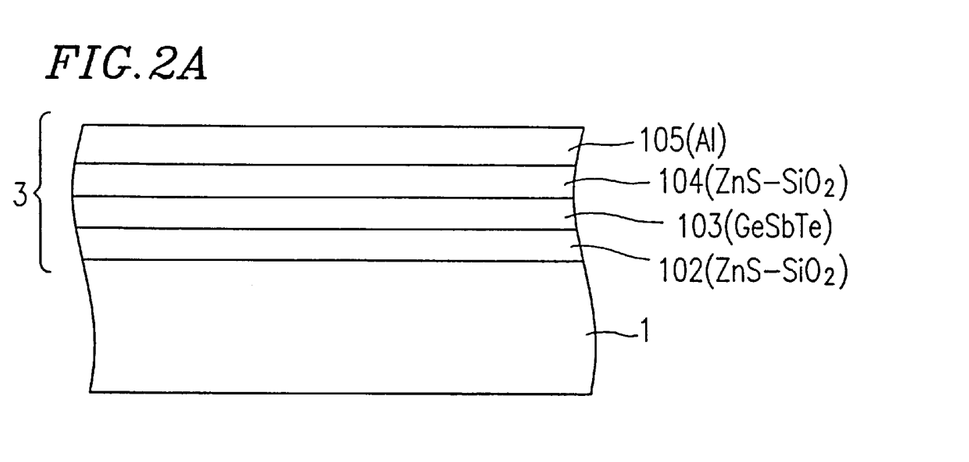
FIG. 2A is a cross-sectional view of a first substrate and layers provided thereon of the optical disk according to the first example of the present invention.
Figure 2B:
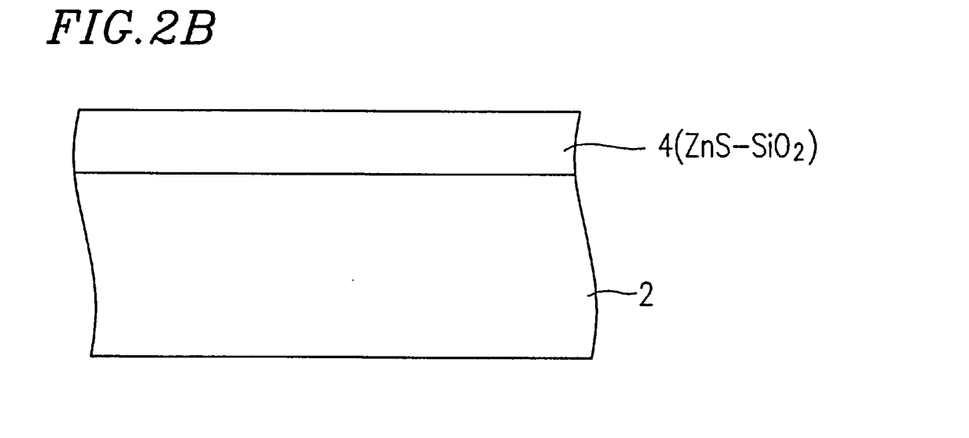
FIG. 2B is a cross-sectional view of a second substrate and layers provided thereon of the optical disk according to the first example of the present invention.

The first substrate 1 shown in FIG. 1A and the second substrate 2 shown in FIG. 1B are formed in the same step by an injection method. The first substrate 1 and the second substrate 2 are formed of the same material and have the same size and shape. For example, the first substrate 1 and the second substrate 2 are formed of a polycarbonate and each have a thickness of about 0.6 mm, a diameter of about 120 mm, and a central hole diameter of about 15 mm. The central hole of the first substrate 1 is represented by reference numeral 1a, and the central hole of the second substrate 2 is represented by reference numeral 2a. The first substrate 1 and the second substrate 2 each have a guide groove (not shown) for signal recording in the top surfaces thereof (top surfaces in FIGS. 1A and 1B).

Figure 1C:
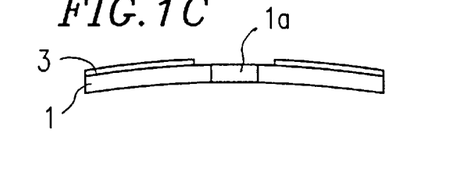

As shown in FIG. 1C, the laminated information rewriting layer 3 is provided on the top surface of the first substrate 1. In more detail, as shown in FIG. 2A, the laminated information rewriting layer 3 includes a dielectric layer 102 formed of $ZnS$—$SiO_2$ (mixture of $ZnS$ and $SiO_2$), a recording layer 103 formed of GeSbTe alloy, a dielectric layer 104 formed of $ZnS$—$SiO_2$, and a metal layer 105 formed of Al as a reflective layer, which are laminated on the top surface of the first substrate 1 in this order.

The dielectric layer 102 is formed of $ZnS$—$SiO_2$ on the top surface of the first substrate 1 to a thickness of about 110 nm by sputtering. Next, the recording layer 103 formed of GeSbTe alloy on the dielectric layer 102 to a thickness of about 30 nm by sputtering. GeSbTe alloy reversibly changes between an amorphous state and a crystalline state in accordance with laser light radiation. Then, the dielectric layer 104 is formed of $ZnS$—$SiO_2$ on the recording layer 103 to a thickness of about 20 nm by sputtering. The metal layer 105 is formed of Al on the dielectric layer 104 to a thickness of about 100 nm by sputtering. Thus, the laminated information rewriting layer 3 is formed.

As shown in FIG. 1C, the first substrate 1 is warped, by a compressive stress of the laminated information rewriting layer 3, at about 1.5° at an outer periphery thereof with the top surface on which the laminated information rewriting layer 3 is projecting. The compression stress warp is mostly generated by the dielectric layers 102 and 104 formed of ZnS—SiO$_2$.

Figure 3:
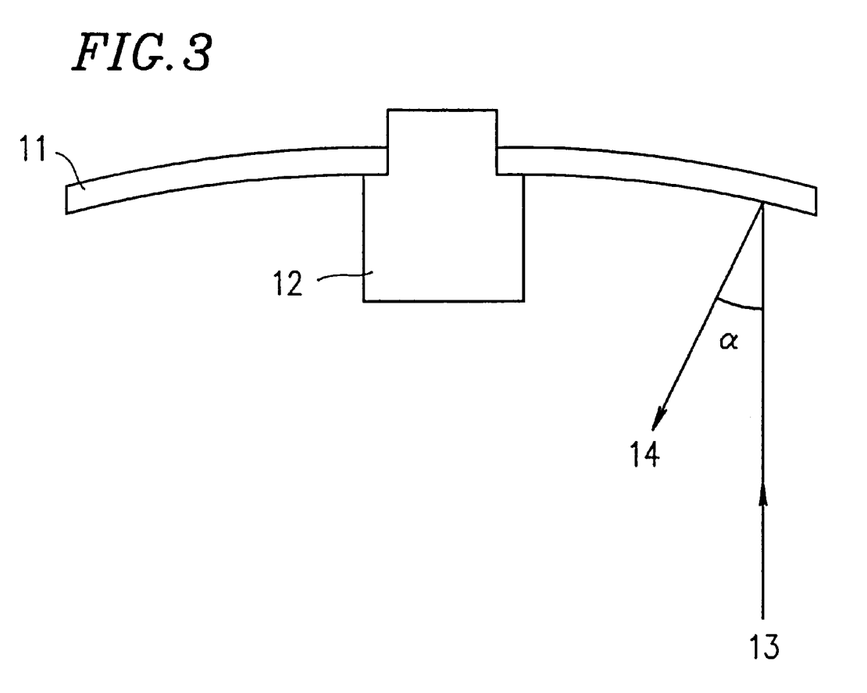
FIG. 3 shows a method for measuring the warp angle of a substrate.

The warping angle is determined as shown in FIG. 3. A plate 11 corresponding to the first and second substrates 1 and 2 is held by a support 12 so as to be horizontal at the center thereof or in the vicinity thereof. Laser light 13 as collimated light having a diameter of about 1 mm is incident on the plate 11 from below. The angle of the laser light 13 and light 14 reflected by the plate 11 is set as warp angle α(°).

The tolerable warp angle for an optical disk varies in accordance with the apparatus for reproducing the information stored in the optical disk. For example, the warp angle needs to be about 0.7° or less.

When the first substrate 1 which is warped by the provision of the laminated information rewriting layer 3 and the second substrate 2, which is flat, are assembled with an adhesive, the resultant optical disk has a warp angle of about 1° or more, whether the adhesive is a hot melt resin or a UV curable resin, and is not usable.

Figure 1D:
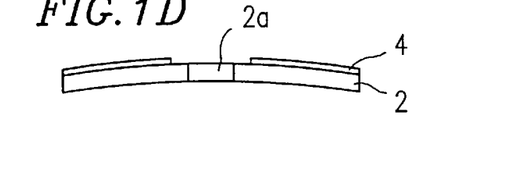

As shown in FIG. 2B, a dielectric layer 4 is formed of Zns—SiO$_2$ on a top surface of the second substrate 2 to a thickness of about 130 nm by sputtering. Thus, the second substrate 2 has the same warp angle with that of the first substrate 1 as shown in FIG. 1D.

Figure 1E:
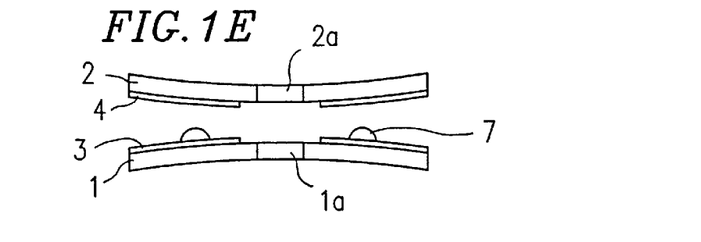
Figure 1F:
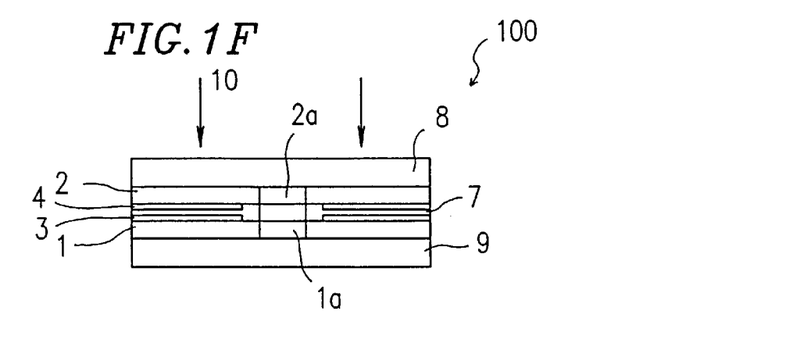

As shown in FIG. 1E, a UV curable resin 7 is dropped on the laminated information rewriting layer 3 in the vicinity of the inner circumference of the first substrate 1 in a concentric manner, and the first and second substrates 1 and 2 are assembled together in the state of planar symmetry with respect to each other with the layers thereon being inside. Next, as shown in FIG. 1F, the assembled first and second substrates 1 and 2 are held between glass plates 8 and 9, thereby substantially eliminating the warp of the first and second substrates 1 and 2. Then, the assembled body is irradiated with UV light 10 from the side of the second substrate 2, thereby curing the UV resin 7. After removing the glass plates 8 and 9, the optical disk 100, which is flat, is obtained.

The ZnS—SiO$_2$ used for the dielectric layer 4 is substantially transparent with respect to UV light.

The tilt of the optical disk 100 produced in this manner is about 0.5° or less and thus is sufficiently usable. In the above-described example, the first and second substrates 1 and 2 are assembled using UV light. The same effect is achieved by a hot melt method using a hot melt resin or an adhesive tape. According to an alternative method, a UV curable resin which is cured slowly is applied to surfaces of the top layers on the first and second substrates 1 and 2 by spin coating or printing. Hereinafter, such a method will be referred to as a "slowly-effective UV radiation method". Next, the resin is irradiated by UV light to provide the resin with tackiness. Then, the first and second substrates 1 and 2 are pressed together, and then the resin is completely cured. The same effect is achieved by this method. Alternatively, the glass plates 8 and 9 for interposing the first and second substrates 1 and 2 can be replaced with plates of other materials. The warp of the first and second substrates 1 and 2 can be eliminated by other methods.

In the above-described example, the first and second substrates 1 and 2 are identical substrates formed by an injection method. The two substrates can be produced by different molds. The present invention is not limited to the method of production of the substrates.

The dielectric layers 102 and 104 can be formed of the same material as the dielectric layer 4. In such a case, the dielectric material which is isolated from the single target in the same sputtering apparatus can be deposited on the first and second substrates 1 and 2. Thus, the dielectric layers 102 and 4 can be formed in the same step.

It is found that, as the thickness of the dielectric layer 4 provided on the second substrate 2 increases, the warp angle of the second substrate 2 increases. When the thickness of the dielectric layer 4 is about 130 nm, the warp angle of the second substrate 2 becomes almost the same as that of the first substrate 1. When the first and second substrates 1 and 2 have substantially the same warp angle, the stresses in the two substrates are balanced and thus the warp of the optical disk 100 is reduced. The thickness of the dielectric layer 4 provided on the second substrate 2 is preferably determined to warp the second substrate 2 to about the same degree as the first substrate 1. Specifically, in the case where the same material is used for the dielectric layers on the first substrate 1 and the second substrate 2, it is most preferable that the total thickness of one or more dielectric layers on the first substrate 1 is equal to the total thickness of one or more dielectric layers on the second substrate 2.

A metal layer as a reflective layer formed of, for example, Al or Au can be provided on the dielectric layer 4 on the second substrate 2. In this case, UV light cannot be used for assembling the first and second substrates 1 and 2. A hot melt method, a slowly-effective UV radiation method or the like can be used. Providing the metal layer on the dielectric layer 4 is advantageous in improving the external appearance since, even when bubbles are present on the surface on which the resin is applied, such bubbles are covered by the metal layer.

The laminated information rewriting layer 3 can have a different structure from described above. The metal layer 105 can be eliminated, or each or both dielectric layers include a plurality of layers formed of different materials.

EXAMPLE 2

Figure 4A:
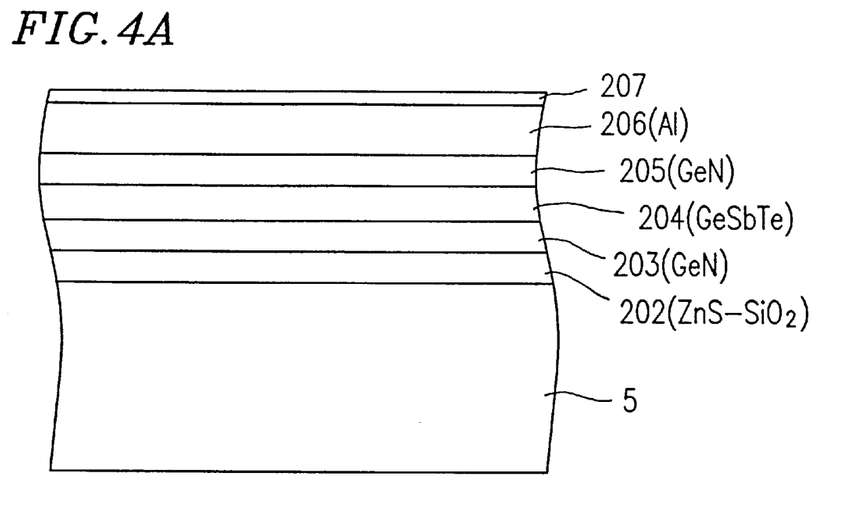
FIG. 4A is a cross-sectional view of a first substrate and layers provided thereon of an optical disk according to a second example of the present invention.
Figure 4B:
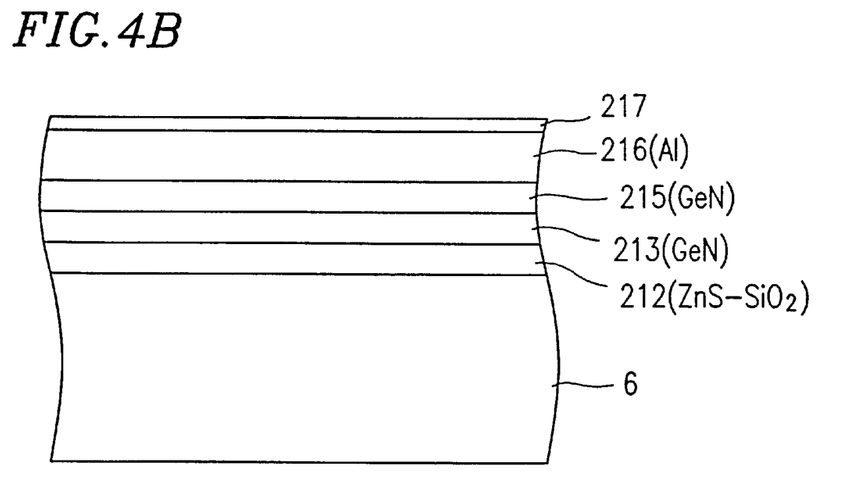
FIG. 4B is a cross-sectional view of a second substrate and layers provided thereon of the optical disk according to the second example of the present invention.
Figure 4C:
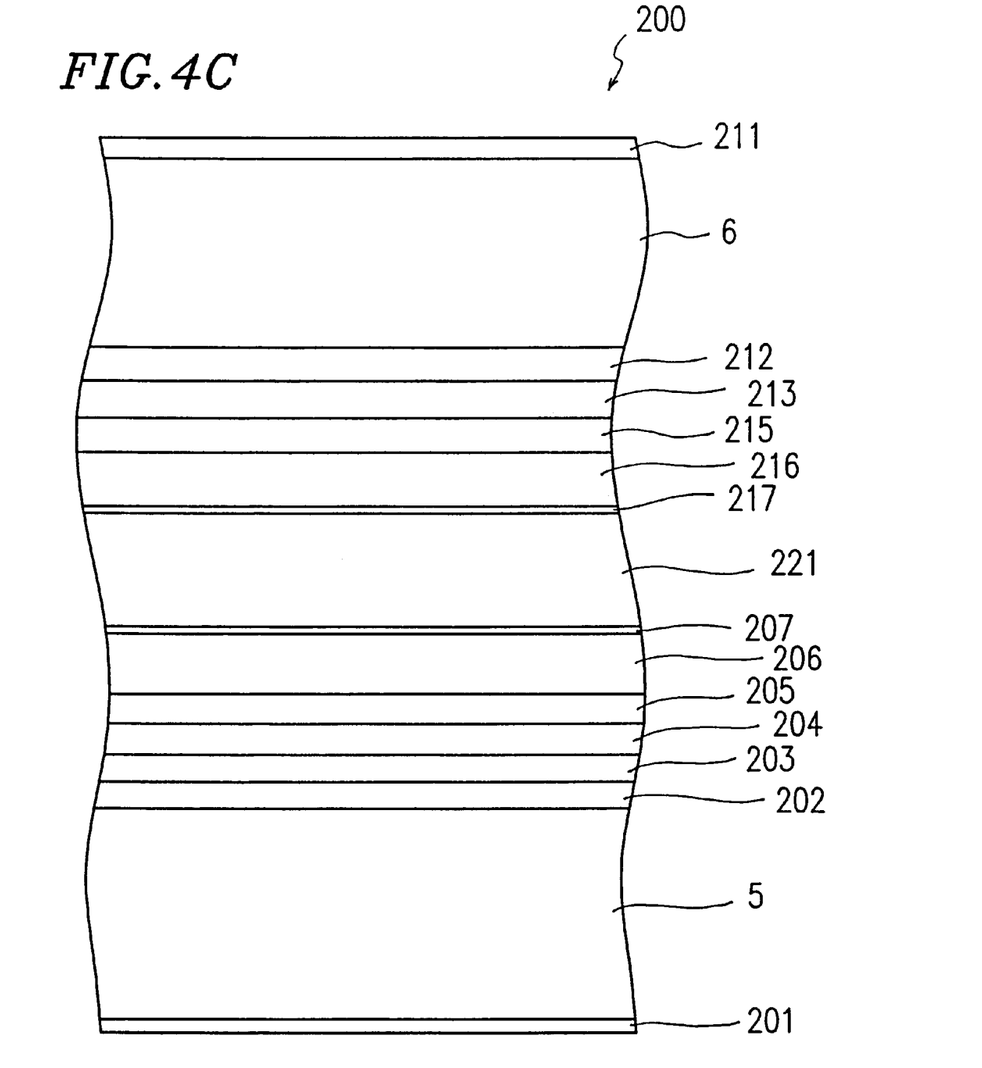
FIG. 4C is a cross-sectional view of the optical disk according to the second example of the present invention.

FIGS. 4A through 4C show an optical information recording medium (referred to simply as an optical disk) 200 according to the second example of the present invention. FIG. 4A is a cross-sectional view of a first substrate 5 and layers provided thereon, and FIG. 4B is a cross-sectional view of a second substrate 6 and layers provided thereon. FIG. 4C is a cross-sectional view of the optical disk 200 including the first and second substrates 5 and 6 and the layers provided thereon.

As shown in FIG. 4A, provided sequentially on the first substrate 5 are a dielectric layer 202 formed of ZnS—SiO$_2$, a dielectric layer 203 formed of GeN, a recording layer 204 formed of GeSbTe alloy, a dielectric layer 205 formed of GeN, a metal layer 206 as a reflective layer formed of Al, and an overcoat layer 207.

As shown in FIG. 4B, provided sequentially on the second substrate 6 are a dielectric layer 212 formed of ZnS—SiO$_2$, a dielectric layer 213 formed of GeN, a dielectric layer 215 formed of GeN, a metal layer 216 as a reflective layer formed of Al, and an overcoat layer 217.

As shown in FIG. 4C, the first and second substrates 5 and 6 are assembled together with the overcoat layers 207 and 217 as innermost layers and with a resin layer 221 interposed between the overcoat layers 207 and 217. Hardcoat layers 201 and 211 are provided on outer surfaces of the assembled first and second substrates 5 and 6.

The layers provided on the second substrate 6 are the same as the layers provided on the first substrate 5 except that the recording layer 204 is provided above the first substrate 5. The dielectric layers, the metal layer and the overcoat layer are provided on both the first and second substrates 5 and 6. Each of the dielectric layers, the metal layers and the overcoat layers on the first and second substrates 5 and 6 respectively have the same thicknesses.

In such a structure, substantially the same stress acts on the first and second substrates 5 and 6, and as a result, the first and second substrates 5 and 6 are warped to substantially the same degree. Even when the stress acting on the first and second substrates 5 and 6 changes in accordance with the passage of time, the change of the stress acting on the first substrate 5 and the change of the stress acting on the second substrate 6 are substantially the same. Accordingly, the optical disk 200 is kept flat for a long period of time.

When the optical disk 200 is seen from the side of the second substrate 6, light which is incident on the second substrate 6 and reflected by the metal layer 216 is colored yellow by the dielectric layers 213 and 215 formed of GeN. Consequently, the unrecordable surface of the optical disk 200 looks yellow.

When the optical disk 200 is seen from the side of the first substrate 5, light which is incident on the first substrate 5 and reflected by the metal layer 206 is colored yellow by the dielectric layers 203 and 205 formed of GeN and also colored blue by the recording layer 204 formed of GeSbTe alloy. Since the coloring degree of blue is stronger than the coloring degree of yellow, the recordable surface of the optical disk 200 looks blue.

Accordingly, the recordable surface and the unrecordable surface are easily distinguishable.

EXAMPLE 3

FIGS. 5A through 5F are cross-sectional views illustrating a method for producing an optical information recording medium (referred to simply as an optical disk) 300 according to a third example of the present invention.

The optical disk 300 in the third example includes a first substrate 21 and a second substrate 22, each having a thickness of 0.6 mm, which are assembled together. The first substrate 21 is provided with, on the top surface thereof, a laminated information rewriting layer 23 (FIG. 5C) including at least a dielectric layer and a recording layer. By providing the laminated information rewriting layer 23, the first substrate 21 warps. Accordingly, the second substrate 22 is provided with a resin layer 25 on the bottom surface thereof so that the resin layer 25 is not opposed to the laminated information rewriting layer 23 when the first and second substrates 21 and 22 are assembled. The resin layer 25 is formed of a resin which shrinks when being cured. By providing the resin layer 25, the second substrate 22 is also warped. Then, the first and second substrate 21 and 22 are assembled together. Thus, the optical disk 300, which is flat, is obtained.

Figure 5A:
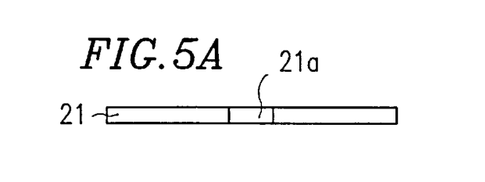
FIGS. 5A through 5F are cross-sectional views illustrating a method for producing an optical disk according to a third example of the present invention.
Figure 5B:
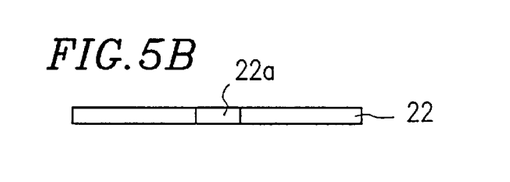

The first substrate 21 shown in FIG. 5A and the second substrate 22 shown in FIG. 5B are formed in the same step by an injection method. The first substrate 21 and the second substrate 22 are formed of the same material and have the same size and shape. For example, the first substrate 21 and the second substrate 22 are formed of a polycarbonate and each have a thickness of about 0.6 mm, a diameter of about 120 mm, and a central hole diameter of about 15 mm. The central hole of the first substrate 21 is represented by reference numeral 21a, and the central hole of the second substrate 22 is represented by reference numeral 22a. The first substrate 21 and the second substrate 22 each have a guide groove (not shown) for signal recording in the top surfaces thereof (top surfaces in FIGS. 5A and 5B).

Figure 5C:
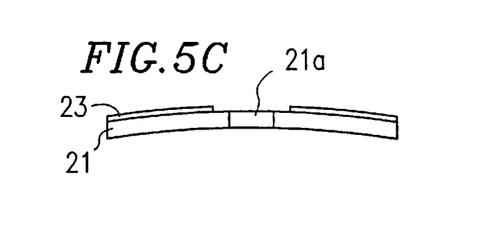

As shown in FIG. 5C, the laminated information rewriting layer 23 is provided on the top surface of the first substrate 21. The laminated information rewriting layer 23 has the same structure as that of the laminated information rewriting layer 3 in the first example. The first substrate 21 is warped at about 1.5° at an outer periphery thereof with the top surface on which the laminated information rewriting layer 23 is projecting.

Figure 5D:
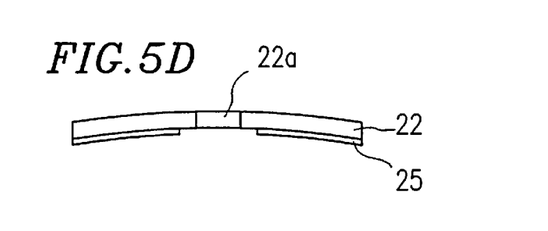
Figure 5E:
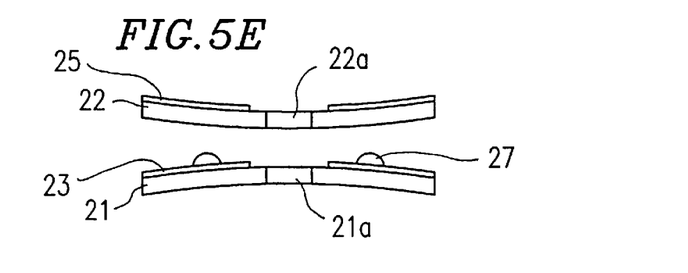

As shown in FIG. 5D, the resin layer 25 formed of a resin which has its volume reduced when being cured is formed on the bottom surface of the second substrate 22, i.e., the surface which is not opposed to the first substrate 21 when the first and second substrates 21 and 22 are assembled. Specifically, a UV curable resin is dropped on the bottom surface of the second substrate 22, and the second substrate 22 is spun (spin coating), thereby forming the resin layer 25 having a uniform thickness of about 5 $\mu$m. Then, the resin layer 25 is irradiated with UV light. The UV curable resin shrinks when being cured, and thus the volume thereof changes by about 10% or more. As a result, tensile stress acts on the second substrate 22. Thus, as shown in FIG. 5E, the second substrate 22 is warped, with the surface on which the resin layer 25 is not provided projecting. In other words, the surface of the second substrate 22 in which the guide groove is formed is projecting.

Figure 5F:
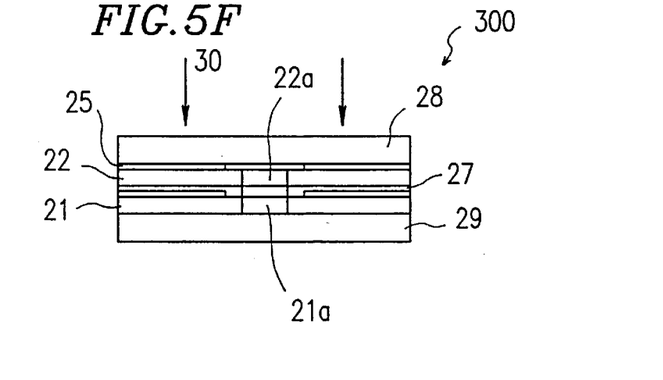

Then, as shown in FIG. 5E, a UV curable resin 27 is dropped on the laminated information rewriting layer 23 in the vicinity of the inner circumference of the fist substrate 21 in a concentric manner, and the first and second substrates 21 and 22 are pressure-contacted to each other in the state of planar symmetry with respect to each other with the laminated information rewriting layer 23 being inside and the resin layer 25 outside. Next, as shown in FIG. 5F, the assembled first and second substrates 21 and 22 are held between glass plates 28 and 29, thereby substantially eliminating the warp of the first and second substrates 21 and 22. Then, the assembled body is irradiated with UV light 30 from the side of the second substrate 22, thereby curing the UV resin 27. After removing the glass plates 28 and 29, the optical disk 300 is obtained.

The resin layer 25 is formed of a material which is substantially transparent with respect to UV light so as to allow for the above-described assembly.

The tilt of the optical disk 300 produced in this manner is about 0.5° or less and thus is sufficiently usable. In the above-described example, the first and second substrates 21 and 22 are assembled using UV light. The same effect is achieved by a hot melt method, a method using an adhesive tape or a slowly-effective UV radiation method.

The resin layer 25 can be formed of a material which is not transparent with respect to visible light. In such a case, the assembly of the first and second substrates 21 and 22 cannot be performed by UV radiation, but can be performed by a hot melt method, a slowly-effective UV radiation method or the like. Use of non-transparent resin for the resin layer 25 is advantageous in improving the external appearance since, even when bubbles are present on the surface on which the resin is applied, such bubbles are covered by the non-transparent resin layer 25.

In the above-described example, the resin layer 25 is formed by spin coating. The resin layer 25 can be formed by, for example, printing, in which case, a graphics can be provided on the resin layer 25. In this manner, the external appearance of the optical disk is further improved, an area in which the user records a list of stored information can be provided.

EXAMPLE 4

FIGS. 6A through 6E are cross-sectional views illustrating a method for producing an optical information recording medium (referred to simply as an optical disk) 400 according to a fourth example of the present invention. The optical disk 400 includes a first substrate 31 and a second substrate 32 assembled together. FIG. 7 is a cross-sectional view of a mold 60 used for forming the first and second substrate 31 and 32.

The first substrate 31 and the second substrate 32 each have a thickness of 0.6 mm. The first substrate 31 is provided with a laminated information rewriting layer 33 (FIG. 6C) including at least a dielectric layer and a recording layer. By providing the laminated information rewriting layer 33, the first substrate 31 warps. Accordingly, the second substrate 32 is also warped, so that the optical disk 400, which is flat, is obtained by assembling the first substrate 31 and the second substrate 32.

Figure 6A:
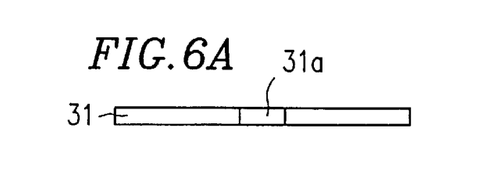
FIGS. 6A through 6E are cross-sectional views illustrating a method for producing an optical disk according to a fourth example of the present invention.
Figure 6B:
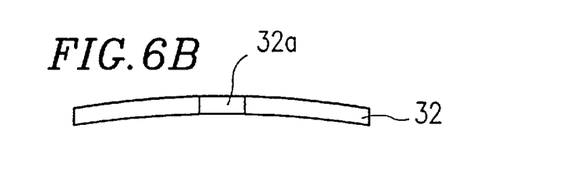
Figure 7:
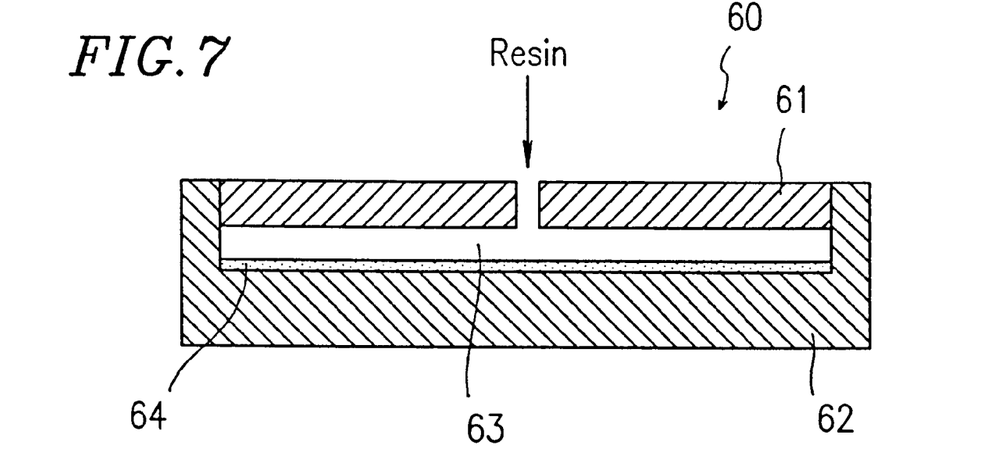
FIG. 7 is a cross-sectional view of a mold used for forming first and second substrate of the optical disk according to the fourth example of the present invention.

The first substrate 31 shown in FIG. 6A and the second substrate 32 shown in FIG. 6B are formed in the same step by an injection method. The first substrate 31 and the second substrate 32 are formed of the same material and have the same size and shape. For example, the first substrate 31 and the second substrate 32 are formed of a polycarbonate and each have a thickness of about 0.6 mm, a diameter of about 120 mm, and a central hole diameter of about 15 mm. The central hole of the first substrate 31 is represented by reference numeral 31a, and the central hole of the second substrate 32 is represented by reference numeral 32a. The first substrate 31 and the second substrate 32 each have a guide groove (not shown) for signal recording in the top surfaces thereof (top surfaces in FIGS. 6A and 6B).

The formation of the first and second substrates 31 and 32 will be described with reference to FIG. 7.

The mold 60 shown in FIG. 7 includes upper and lower molds 61 and 62 opposed to each other. A space 63 is formed between the upper and lower molds 61 and 62. A resin (for example, a polycarbonate) in a melted state is injected into the space 63, thereby forming each of the first and second substrates 31 and 32 (FIGS. 6A through 6E). The lower mold 62 includes a stamper 64 for forming a guide groove for signal recording in the surface of each of the first and second substrates 31 and 32. The mold 60 is maintained at a high temperature of, for example, about 100° C. or more, so that the injected resin is not cooled rapidly and the groove pattern of the stamper 64 is accurately transferred to the surface of each of the first and second substrates 31 and 32.

Figure 6C:
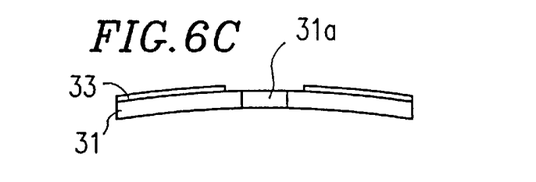

As shown in FIG. 6C, the laminated information rewriting layer 33 is provided on a top surface of the first substrate 31. The laminated information rewriting layer 33 has the same structure as that of the laminated information rewriting layer 3 in the first example. The first substrate 31 is warped at about 1.5° at an outer periphery thereof with the top surface on which the laminated information rewriting layer 33 is projecting.

The second substrate 32 is formed so that the surface in which the guide groove is formed projects. The warp angle of the second substrate 32 is adjusted by changing the injection conditions.

For example, when the upper and lower molds 61 and 62 (FIG. 7) are set to have the temperature in condition 1 or 2 shown in Table 1, the second substrate 32 is warped to substantially the same degree as that of the first substrate 31. The warp angle is larger by condition 2 than by condition 1.

TABLE 1

|  |  | Condition 1 | Condition 2 |
|---|---|---|---|
| Temperature | Mold 61 | 125° C. | 128° C. |
|  | Mold 62 | 130° C. | 130° C. |

Conditions 1 and 2 are mere examples for a specific mold. The conditions for warping the first and second substrates 31 and 32 change in accordance with, for example, the structure of the mold and the material of the substrate. Since the birefringence characteristics of the substrates changes in accordance with the temperature of the mold, the temperature of the mold needs to be set in consideration of various characteristics of the substrates.

Figure 6D:
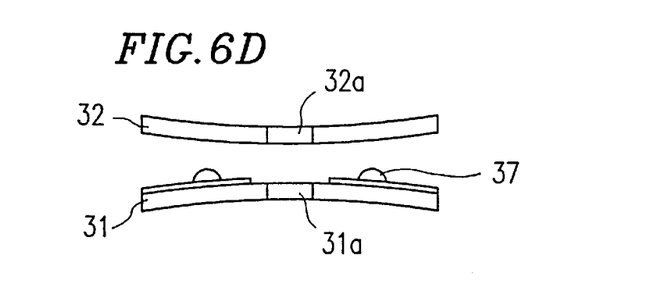
Figure 6E:
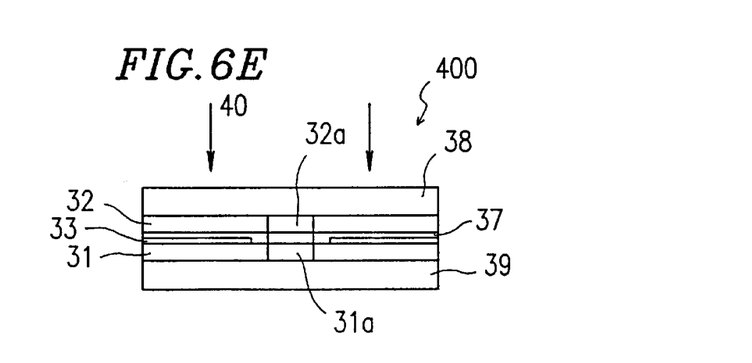

As shown in FIG. 6D, a UV curable resin 37 is dropped on the laminated information rewriting layer 33 in the vicinity of the inner circumference of the first substrate 31 in a concentric manner, and the first and second substrates 31 and 32 are assembled together in the state of planar symmetry with respect to each other with the laminated information rewriting layer 33 being inside. Next, as shown in FIG. 6E, the assembled first and second substrates 31 and 32 are held between glass plates 38 and 39, thereby substantially eliminating the warp of the first and second substrates 31 and 32. Then, the assembled body is irradiated with UV light 40 from the side of the second substrate 32, thereby curing the UV resin 37. After removing the glass plates 38 and 39, the optical disk 400 is obtained.

The tilt of the optical disk 400 produced in this manner is about 0.5° or less and thus is sufficiently usable. In the above-described example, the first and second substrates 31 and 32 are assembled using UV light. The same effect is achieved by a hot melt method using a hot melt resin, a method using an adhesive or a slowly-effective UV radiation method.

In this example, the second substrate 32 is warped while being formed by an injection method. Any other method which warps the second substrate 32 is usable.

EXAMPLE 5

FIGS. 8A through 8F are cross-sectional views illustrating a method for producing an optical information recording medium (referred to simply as an optical disk) 500 according to a fifth example of the present invention. FIG. 9 is a detailed cross-sectional view of the optical disk 500.

The optical disk 500 includes a first substrate 41 and a second substrate 42, each having a thickness of 0.6 mm, which are assembled together. The first substrate 41 is provided with a laminated information rewriting layer 43 (FIG. 8C) including at least a dielectric layer and a recording layer. By providing the laminated information rewriting layer 43, the first substrate 41 warps. Accordingly, a resin layer 44 formed of a resin which shrinks when being cured is further provided on the laminated information rewriting layer 43, thereby substantially eliminating the warp of the first substrate 41. Then, the first substrate 41 and the second substrate 42 are assembled with the resin layer 44 being inside. Thus, the optical disk 500, which is flat, is obtained.

Figure 8A:
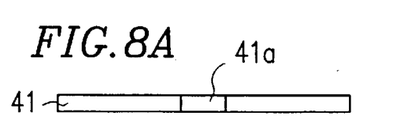
FIGS. 8A through 8F are cross-sectional views illustrating a method for producing an optical disk according to a fifth example of the present invention of the present invention.
Figure 8B:
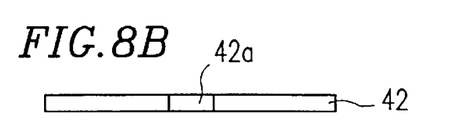
Figure 9:
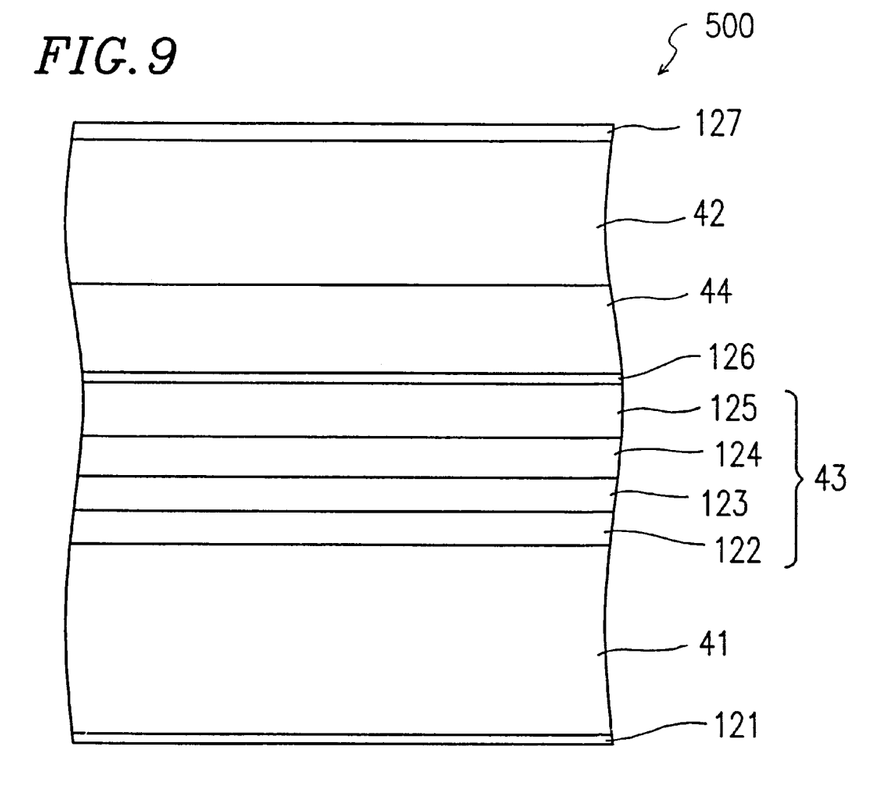
FIG. 9 is a cross-sectional view of the optical disk according to the fifth example of the present invention.

The first substrate 41 shown in FIG. 8A and the second substrate 42 shown in FIG. 8B are formed in the same step by an injection method. The first substrate 41 and the second substrate 42 are formed of the same material and have the same size and shape. For example, the first substrate 41 and the second substrate 42 are formed of a polycarbonate and each have a thickness of about 0.6 mm, a diameter of about 120 mm, and a central hole diameter of about 15 mm. The central hole of the first substrate 41 is represented by reference numeral 41a, and the central hole of the second substrate 42 is represented by reference numeral 42a. The first substrate 41 and the second substrate 42 each have a guide groove (not shown) for signal recording in the top surfaces thereof (top surfaces in FIGS. 8A and 8B).

Figure 8C:
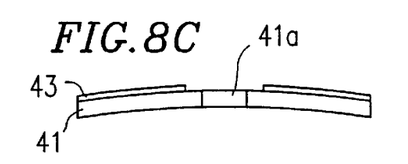

As shown in FIG. 8C, the laminated information rewriting layer 43 is provided on the top surface of the first substrate 41. The laminated information rewriting layer 43 has the same structure as that of the laminated information rewriting layer 3 in the first example. As shown in FIG. 8C, the first substrate 41 is warped at about 1.5° at an outer periphery thereof with the top surface on which the laminated information rewriting layer 43 is projecting.

Figure 8D:
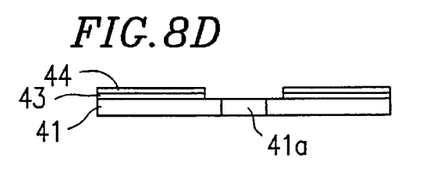
Figure 8E:
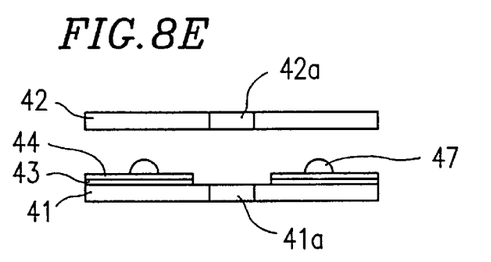

As shown in FIG. 8D, the resin layer 44 formed of a resin which shrinks when being cured is formed on the laminated information rewriting layer 43. The warp of the first substrate 41 is substantially eliminated by the stress accompanying the shrinkage of the resin layer 44. Specifically, a UV curable resin is dropped on the bottom surface of the laminated information rewriting layer 43, and the first substrate 41 is spun (spin coating), thereby forming the resin layer 44 having a uniform thickness of about 5 µm. Then, the resin layer 44 is irradiated with UV light. The UV curable resin shrinks when being cured, and thus the volume thereof changes by about 10% or more. As a result, tensile stress acts on the first substrate 44. Thus, as shown in FIG. 8E, the first substrate 41 is deformed so as to reduce the warp thereof.

Figure 8F:
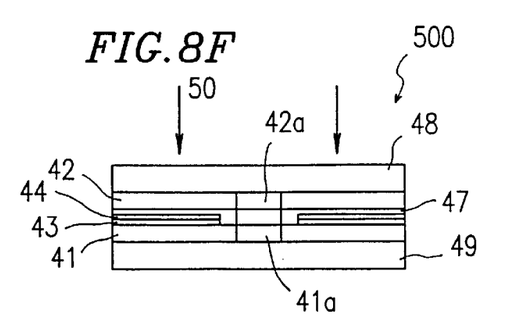

Then, a UV curable resin 47 is dropped on the laminated information rewriting layer 43 in the vicinity of the inner circumference of the first substrate 41 in a concentric manner, and the first and second substrates 41 and 42 are assembled together in the state of planar symmetry with respect to each other with the layers 43 and 44 being inside. Next, as shown in FIG. 8F, the assembled first and second substrates 41 and 42 are held between glass plates 48 and 49. Then, the assembled body is irradiated with UV light 50 from the side of the second substrate 42, thereby curing the UV resin 47. After removing the glass plates 48 and 49, the optical disk 500 is obtained.

As shown in FIG. 9, the laminated information rewriting layer 43 provided on the first substrate 41 includes a dielectric layer 122, a recording layer 123, a dielectric layer 124 and a metal layer 125. An overcoat layer 126 is provided on the laminated information rewriting layer 43. The resin layer 44 is provided on the second substrate 42. The first and second substrates 41 and 42 are assembled together with the layers 126 and 44 being inside. Hardcoat layers 121 and 127 are provided on outer surfaces of the assembled first and second substrates 41 and 42.

The tilt of the optical disk 500 produced in this manner is about 0.5° or less and thus is sufficiently usable. In the above-described example, the first and second substrates 41 and 42 are assembled using UV light. The same effect is achieved by a hot melt method using a hot melt resin, an adhesive tape or a slowly-effective UV radiation method.

In the case where a resin layer is provided on the surface of the second substrate 42 in which the guide groove is formed, the resin layer preferably has a smaller tensile stress than that of the resin layer 44. Thus, the tilt of the optical disk is reduced. Specifically, a thinner layer of a resin which is the same as that of the resin layer 44 is used, or a resin having a smaller shrinkage ratio when being cured than that of the resin layer 44 is used.

In the case where the resin layer is provided on the second substrate 42, the adhesiveness between the first and second substrate 41 and 42 is improved. Without the resin layer on the second substrate 42, the adhesiveness between the adhesive for bonding the first and second substrate 41 and 42 and the material of the second substrate 42 can be insufficient. When the resin layer 44 formed on the laminated information rewriting layer 43 is substantially transparent with respect to UV light, the first and second substrate 41 and 42 can be assembled using UV light as shown in FIG. 8F.

The resin layer 44 can be formed of a material which is not transparent with respect to visible light. In such a case, the assembly of the first and second substrates 41 and 42 cannot be performed by UV radiation, but can be performed by a hot melt method, a slowly-effective UV radiation method or the like. Use of non-transparent resin for the resin layer 44 is advantageous in improving the external appearance since, even when bubbles are present on the surface on which the resin is applied, such bubbles are covered by the non-transparent resin layer 44.

In the above-described example, the resin layer 44 is formed by spin coating. The resin layer 44 can be formed by, for example, printing, in which case, a graphics can be provided on the resin layer 44. In this manner, the external appearance of the optical disk is further improved.

In the first through fifth examples, each of the first and second substrates has a thickness of about 0.6 mm. The present invention is applicable to substrates having other thicknesses.

In the case where the first and second substrates each have a thickness of more than 0.8 mm, simply assembling the two substrates in the state where the first substrate is warped by providing a laminated information rewriting layer reduces the warp angle of the optical disk, for example, to about 0.7° or less. Thus, the present invention is especially effective to an optical disk produced by assembling substrates each having a thickness of less than 0.8 mm.

In the first through fifth examples, the second substrate has a guide groove for signal recording as well as the first substrate. Since the recording layer is not provided on the second substrate, the guide groove in the second substrate can be eliminated.

As described above, an optical information recording medium for one-side recording and reproduction including two thin substrates assembled together according to the present invention is flat and has a sufficiently small tilt. The optical information recording medium according to the present invention promotes development of and provides optical disk systems capable of higher density recording without requiring a reduction wavelength of the laser light or an increase in the numerical aperture of the objective lens.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording medium, comprising:

a first substrate;

at least a first dielectric layer and a recording layer for signal recording provided on a surface of the first substrate; and a second substrate, wherein the first substrate and the second substrate are assembled together in the state of being warped in planar symmetry with respect to each other and flattened, the first dielectric layer and the recording layer being interposed between the first substrate and the second substrate.

2. An optical information recording medium according to claim 1, further comprising a thin layer provided on a surface of the second substrate, the surface being opposed to the first substrate.

3. An optical information recording medium according to claim 2, wherein the thin layer includes a second dielectric layer.

4. An optical information recording medium according to claim 2, wherein the thin layer includes a second dielectric layer formed of an identical material as that of the first dielectric layer provided on the first substrate.

5. An optical information recording medium according to claim 3, wherein the thin layer includes a metal layer.

6. An optical information recording medium according to claim 2, wherein the thin layer has such a thickness to warp the second substrate to substantially an equal degree with the first substrate.

7. An optical information recording medium according to claim 1, further comprising a resin layer formed of a resin provided on a surface of the second substrate which shrinks when being cured, the resin layer being provided on the surface not facing the first substrate.

8. An optical information recording medium according to claim 7, wherein the resin layer is formed of a UV curable resin.

9. An optical information recording medium according to claim 7, wherein the resin layer is transparent with respect to UV light.

10. An optical information recording medium according to claim 7, wherein the resin layer is non-transparent with respect to visible light.

11. An optical information recording medium according to claim 10, wherein the resin layer has graphics thereon.

12. An optical information recording medium according to claim 1, wherein the second substrate is warped while being formed.

13. An optical information recording medium according to claim 12, wherein the second substrate is formed by an injection method.

14. An optical information recording medium according to claim 1, wherein at least one of the first substrate and the second substrate has a thickness of about 0.8 mm or less.

15. A method for producing an optical information recording medium, comprising the steps of:

forming at least a first dielectric layer and a recording layer for signal recording on a surface of a first substrate;

warping a second substrate; and assembling the first substrate, which is warped, and the second substrate in planar symmetry with respect to each other, and flattening an assembly of the first substrate and the second substrate.

16. A method according to claim 15, wherein the step of warping the second substrate includes the step of forming a thin layer on a surface of the second substrate, the surface being opposed to the first substrate.

17. A method according to claim 16, wherein the step of forming the thin layer includes the step of forming a second dielectric layer.

18. A method according to claim 16, wherein the step of forming the thin layer includes the step of forming a second dielectric layer formed of an identical material with that of the first dielectric layer.

19. A Method according to claim 17, wherein the step of forming the thin layer includes the step of forming a metal layer.

20. A method according to claim 15, wherein the step of warping the second substrate includes the step of forming a resin layer of a resin which shrinks when being cured on a surface of the second substrate, the resin layer being formed on the surface not facing the first substrate.

21. A method according to claim 20, wherein the step of forming the resin layer includes the step of forming a UV curable resin layer.

22. A method according to claim 15, wherein the step of warping the second substrate includes the step of causing a warp to the second substrate while the second substrate is being formed.

23. A method according to claim 22, wherein the second substrate is formed by an injection method.

\* \* \* \* \*